US008668852B2

(12) United States Patent
Ookubo et al.

(10) Patent No.: US 8,668,852 B2
(45) Date of Patent: Mar. 11, 2014

(54) POWDER FOR MOLDING AND METHOD FOR PRODUCING MOLDED ARTICLE USING THE SAME

(75) Inventors: Akira Ookubo, Naruto (JP); Tomohide Koizumi, Naruto (JP); Kazuma Tamura, Naruto (JP)

(73) Assignee: Tomita Pharmaceutical Co., Ltd., Naruto-shi (JP)

( * ) Notice: Subject to any disclaimer, the term of this patent is extended or adjusted under 35 U.S.C. 154(b) by 159 days.

(21) Appl. No.: 13/203,143

(22) PCT Filed: Feb. 26, 2010

(86) PCT No.: PCT/JP2010/053070
§ 371 (c)(1),
(2), (4) Date: Sep. 30, 2011

(87) PCT Pub. No.: WO2010/098441
PCT Pub. Date: Sep. 2, 2010

(65) Prior Publication Data
US 2012/0018915 A1    Jan. 26, 2012

(30) Foreign Application Priority Data
Feb. 26, 2009  (JP) .................................. 2009-44893

(51) Int. Cl.
*B29C 67/00* (2006.01)
(52) U.S. Cl.
USPC ............................ 264/113; 264/308; 428/402
(58) Field of Classification Search
None
See application file for complete search history.

(56) References Cited

U.S. PATENT DOCUMENTS

| 6,403,002 | B1 | 6/2002 | van der Geest |
| 7,942,187 | B2* | 5/2011 | Marutani et al. ............... 164/4.1 |
| 2004/0056378 | A1 | 3/2004 | Bredt et al. |
| 2005/0046067 | A1* | 3/2005 | Oriakhi et al. ................ 264/113 |
| 2006/0230984 | A1 | 10/2006 | Bredt et al. |
| 2009/0008055 | A1 | 1/2009 | Marutani et al. |
| 2009/0298033 | A1 | 12/2009 | Suzuki et al. |

FOREIGN PATENT DOCUMENTS

| EP | 433265 A2 | 12/1990 |
| JP | 2006-504813 A | 2/1996 |
| JP | H3-281540 A | 12/1996 |
| JP | 2001-524897 A | 12/2001 |
| JP | 2004-82206 A | 3/2004 |
| WO | 2007/077731 A1 | 7/2007 |
| WO | 2007/122804 A1 | 11/2007 |

OTHER PUBLICATIONS

Extended European Search Report dated Oct. 9, 2012 issued in the corresponding European Patent Application No. 10746320.0.

* cited by examiner

*Primary Examiner* — Mary F Theisen
(74) *Attorney, Agent, or Firm* — Fox Rothschild LLP

(57) ABSTRACT

The present invention provides a powder for molding that reduces or prevents drawbacks such as unevenness and low fluidity when a mixed powder is used as a powder for molding. The present invention relates to powders for molding including particles in which each particle contains an inorganic component and a water-soluble organic polymer component and methods for producing the same.

11 Claims, 13 Drawing Sheets

Fig.2
(a)
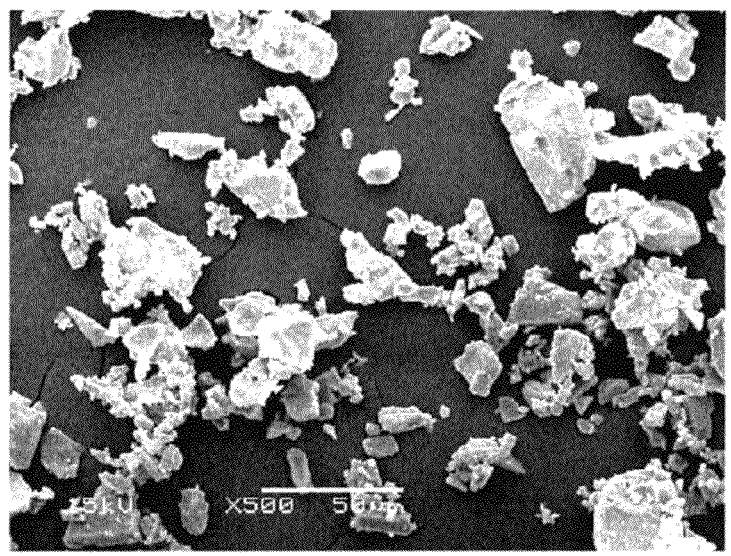
Prior Art
(b)
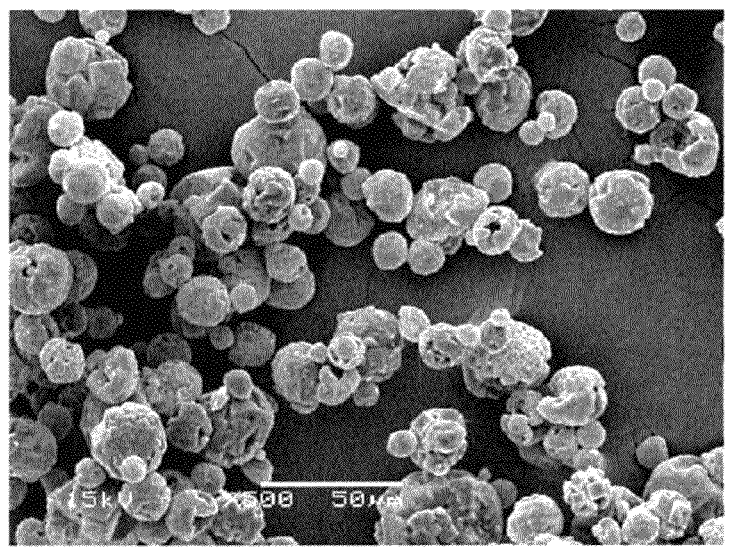

Fig.3
(a)
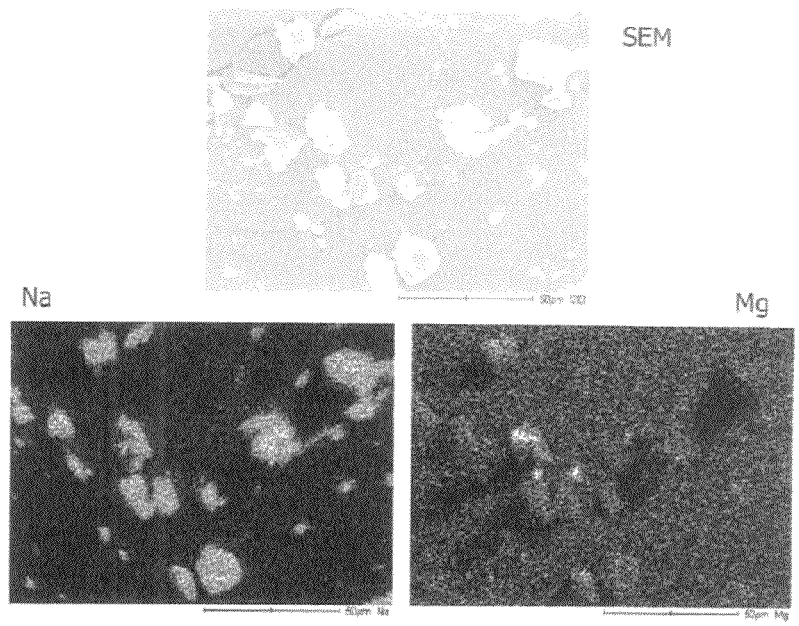
Prior Art
(b)
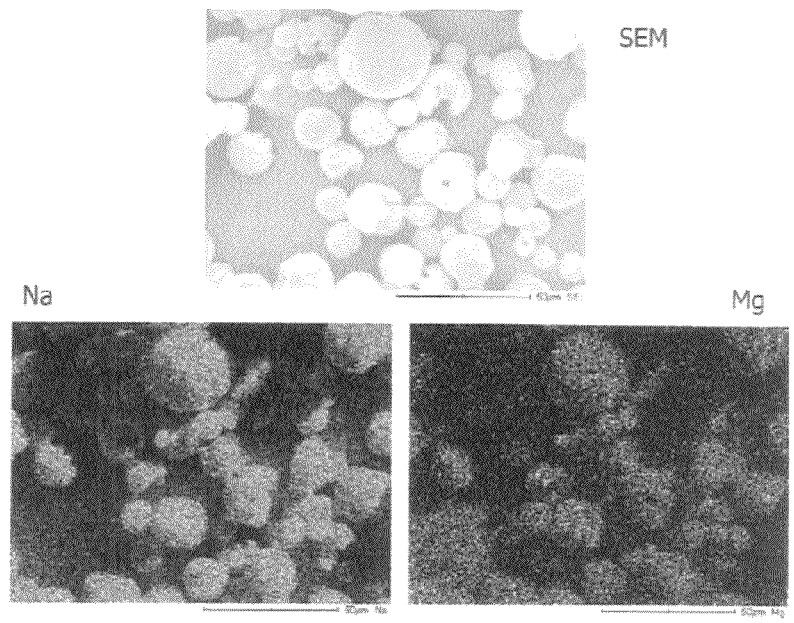

Prior Art

Fig.6
(a)
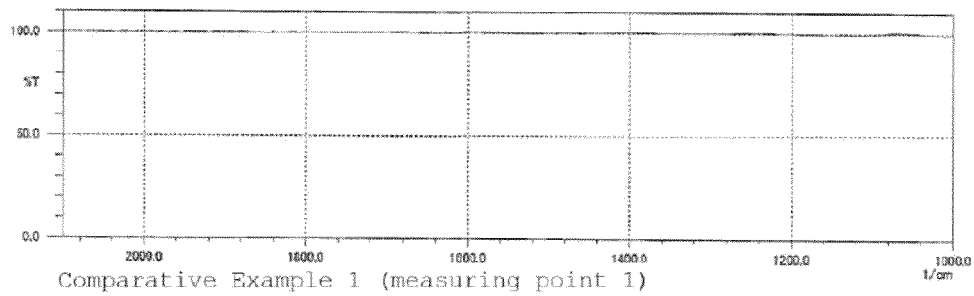
Comparative Example 1 (measuring point 1)
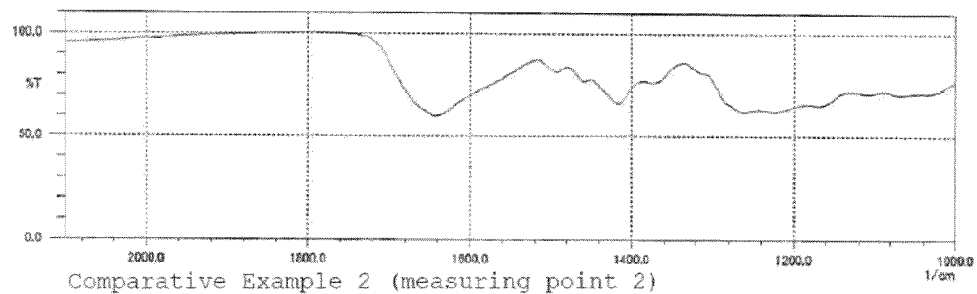
Comparative Example 2 (measuring point 2)
Prior Art
(b)
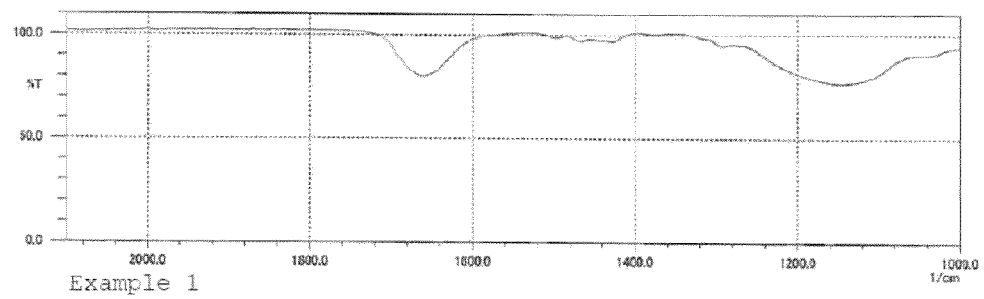
Example 1

Fig.12
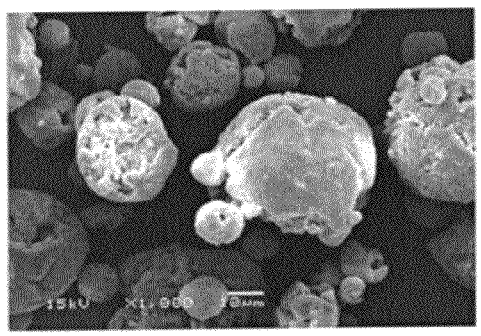
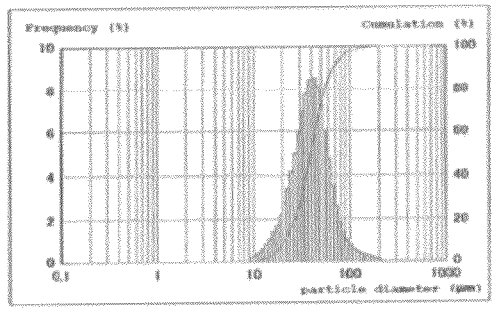
Fig.13
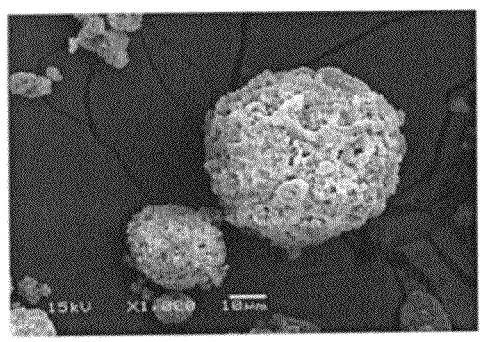
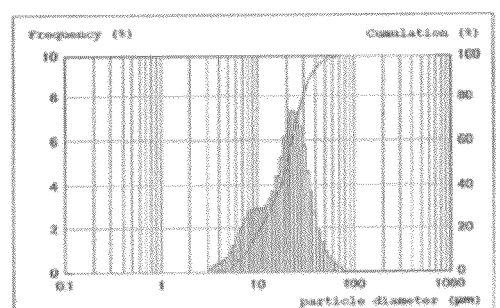

Fig.15
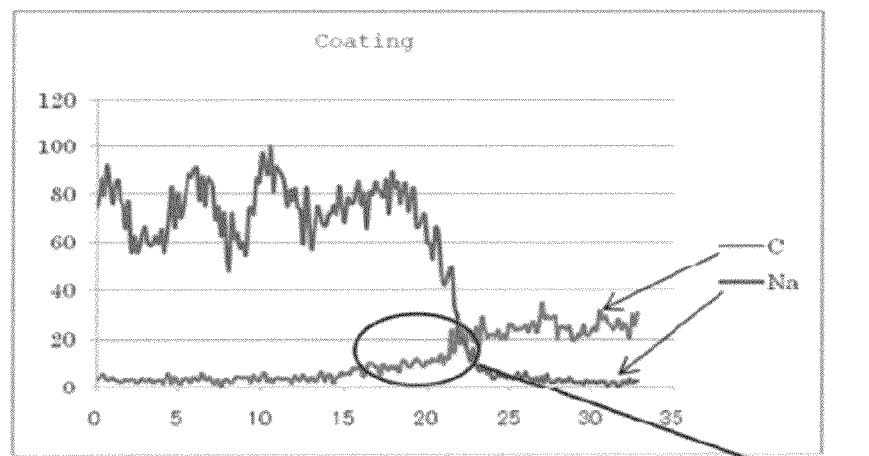
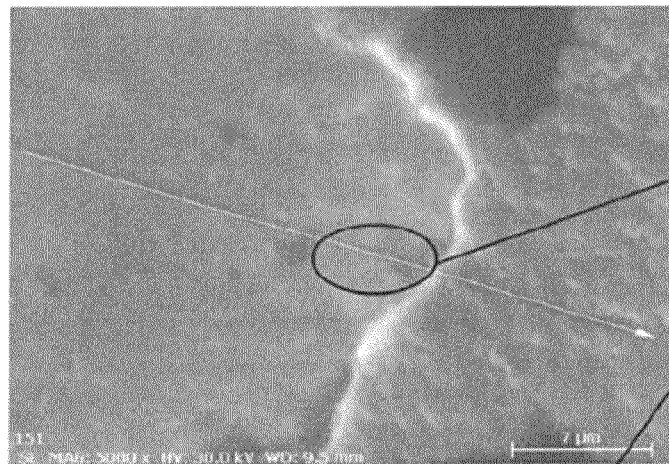
A
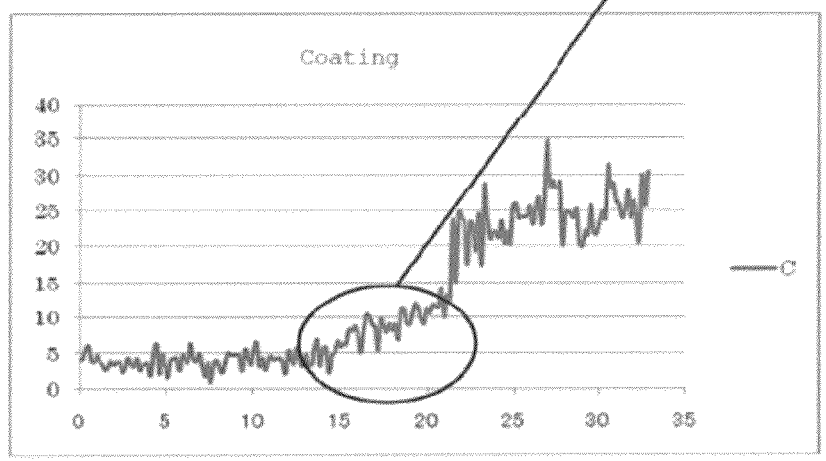

POWDER FOR MOLDING AND METHOD FOR PRODUCING MOLDED ARTICLE USING THE SAME

CROSS-REFERENCE TO RELATED APPLICATIONS

This patent application is a U.S. national stage application under 35 U.S.C. §371 of International Patent Application No. PCT/JP2010/053070 filed on Feb. 26, 2010, which claims the benefit of foreign priority to Japanese Patent Application No. JP 2009-044893 filed on Feb. 26, 2009, the disclosures of all of which are hereby incorporated by reference in their entireties. The International Application was published in Japanese on Sep. 2, 2010, as International Publication No. WO 2010/098441 A1 under PCT Article 21(2).

FIELD OF THE INVENTION

The present invention relates to powders for molding used for Rapid Prototyping (powder-layered manufacturing process) and methods for producing molded articles using the powders. More specifically, it relates to powders for molding using so-called Rapid Prototyping or three-dimensional printing techniques by which a pattern such as a core used for producing a mold or template for cast is automatically produced based on computer data and methods for producing the powders.

BACKGROUND OF THE INVENTION

Rapid prototyping has been drawing attention as a method for precisely producing molded articles including a three-dimensional curved surface at high speed. Specifically, the method is that a three-dimensional structure is sliced at constant intervals in the height direction, each obtained cross section is analyzed to collect information, and the cross sectional information is laminated to reconstruct the three-dimensional structure. Rapid prototyping is classified into some methods depending on the molding method. Examples of the method include optical molding method, paper lamination method, powder sintering method, and powder-layered manufacturing method (powder adhesion method). Among them, the powder-layered manufacturing method is expected to be put into practical use because it can be performed with a convenient apparatus such as an inkjet printer and molding can be performed at relatively high speed.

The powder-layered manufacturing method (powder adhesion method) is a method for obtaining, as a molded body, a laminated body that is obtained by repeating a step of flatly spreading a powder layer to form a powder layer and a step of spraying a spray solution onto a predetermined area in the powder layer.

For such powder-layered manufacturing method, some methods have been proposed until now. For example, there is a method for forming an artifact. The method includes: applying, to a first area in a first layer of nonadhesive particles each having an activatable adhesive, a liquid for activating the adhesive in an amount sufficient to activate the adhesive to the extent that the particles in the first area adhere to each other to form an essentially solid single first cross section area that is surrounded by the nonadhesive particles; forming a second layer of the particles on the first layer; and applying, to a first area in the second layer of the particles, the liquid in an amount sufficient to activate the adhesive to the extent that the particles in the first area in the second layer adhere to each other and to at least a part of the first area in the first layer for adhering to the first cross section area and for forming a second cross section area that is surrounded by the nonadhesive particles. In the method, at least a portion of the particles have poor solubility in the liquid, and the first cross section area forms, together with the second cross section area, an essentially solid single article (Patent Document 1).

Furthermore, the inventors of the present invention have developed and applied a method for producing a pattern. The method includes: a step (a) of planar spreading, on a table, a mixed powder containing a water-soluble inorganic salt and a water-soluble organic polymer component, and then selectively spraying, onto the mixed powder layer, a spray liquid containing at least one selected from a water-miscible organic solvent and water through a nozzle to make the binding strength among the mixed powder particles in the sprayed area higher than that among the mixed powder particles in the unsprayed area; a step (b) of further spreading the mixed powder on the mixed powder layer after the spray, and then selectively spraying the spray liquid through a nozzle onto the mixed powder layer; a step (c) of repeating the step (b) twice or more times to form a pattern having a shape from the sprayed areas; and a step (d) of removing the pattern from the powder (Patent Document 2).

CITATION LIST

Patent Document

Patent Document 1: Japanese Patent No. 3607300
Patent Document 2: WO 2007/077731

BRIEF SUMMARY OF THE INVENTION

However, each of these methods employs a mixed powder containing adhesive particles and non-adhesive particles as the powder for molding, and thus the content of each component becomes uneven (uneven distribution) even when the powder is thoroughly mixed. Then, the unevenness causes various problems. For example, when the content of the adhesive component is uneven, some areas have low binding strength among powder particles, and thus desired reproducibility cannot be obtained. This problem becomes more serious in complex molded articles. Furthermore, in a mixed powder by dry blending, because particles have indefinite shape, there is room for improvement in fluidity, planar spreading properties, and the like, when such particles are planar spread.

Therefore, a main object of the present invention is to provide a powder for molding that mitigates or removes the drawbacks such as unevenness of component content and low fluidity when a mixed powder is used as a powder for molding.

In view of the related art problems, the inventors of the present invention have studied intensively, and as a result, have found that the object of the present invention can be fulfilled by a powder including particles obtained by a particular method, and the invention has been accomplished.

That is, the present invention pertains to powders for molding and methods for producing molded articles using the powders described below.

1. A powder for molding comprising particles, each particle containing an inorganic component and a water-soluble organic polymer component.
2. The powder for molding according to above 1, wherein the inorganic component is a water-soluble inorganic salt.

3. The powder for molding according to above 2, wherein the water-soluble inorganic salt is at least one of an alkali metal salt and an alkaline earth metal salt.

4. The powder for molding according to above 1, wherein the inorganic component includes sodium chloride and magnesium sulfate.

5. The powder for molding according to above 1, wherein the powder is obtained by spray-drying a liquid raw material containing the inorganic component and the water-soluble organic polymer component.

6. The powder for molding according to above 2, wherein the powder is obtained by spray-drying an aqueous solution in which the water-soluble inorganic salt and the water-soluble organic polymer are dissolved in water.

7. The powder for molding according to above 1 used for powder adhesion method.

8. The powder for molding according to above 1 used for a method for producing a molded article, the method comprising a step (a) of spreading the powder on a plane surface to form a powder layer, and thereafter spraying a spray liquid containing at least one of a water-miscible organic solvent and water onto a predetermined area in the powder layer to make the binding strength among particles in the sprayed area higher than the binding strength among particles in the unsprayed area;

a step (b) of further flatly spreading the powder on the powder layer after spray to form an upper powder layer, and thereafter spraying the spray liquid onto a predetermined area in the upper powder layer to make the binding strength among particles in the sprayed area higher than the binding strength among particles in the unsprayed area; and a step (c) of repeating the step (b) once or more times to form a molded article composed of layers of the sprayed areas.

9. The powder for molding according to above 1, wherein the inorganic component and the water-soluble organic polymer component are uniformly mixed in each particle.

10. The powder for molding according to above 1, wherein 1) the inorganic component includes 70 to 90% by weight of sodium chloride as a first component, 2) the inorganic component includes 5 to 25% by weight of magnesium sulfate as a second component, and 3) the water-soluble organic polymer component includes 1 to 10% by weight of polyvinylpyrrolidone.

11. A method for producing a molded article from a powder, the method comprising:

a step (a) of planar spreading a powder for molding on a plane surface to form a powder layer, each particle of the powder containing an inorganic component and a water-soluble organic polymer component, and thereafter spraying a spray liquid containing at least one of a water-miscible organic solvent and water onto a predetermined area in the powder layer to make the binding strength among particles in the sprayed area higher than the binding strength among particles in the unsprayed area;

a step (b) of further flatly spreading the powder for molding on the powder layer after spray to form an upper powder layer, and thereafter spraying the spray liquid onto a predetermined area in the upper powder layer to make the binding strength among particles in the sprayed area higher than the binding strength among particles in the unsprayed area;

a step (c) of repeating the step (b) once or more times to form a molded article composed of layers of the sprayed areas; and a step (d) of removing the molded article from the powder.

12. The producing method according to above 11, wherein the inorganic component is a water-soluble inorganic salt.

13. The producing method according to above 12, wherein the water-soluble inorganic salt is at least one of an alkali metal salt and an alkaline earth metal salt.

14. The producing method according to above 11, wherein the inorganic component includes sodium chloride and magnesium sulfate.

15. The producing method according to above 11, wherein the powder is obtained by spray-drying a liquid raw material containing the inorganic component and the water-soluble organic polymer component.

16. The producing method according to above 12, wherein the powder is obtained by spray-drying an aqueous solution in which the water-soluble inorganic salt and the water-soluble organic polymer are dissolved in water.

17. The producing method according to above 11, wherein the inorganic component and the water-soluble organic polymer component are uniformly distributed throughout each particle.

18. The producing method according to above 11, wherein 1) the inorganic component includes 70 to 90% by weight of sodium chloride as a first component, 2) the inorganic component includes 5 to 25% by weight of magnesium sulfate as a second component, and 3) the water-soluble organic polymer component includes 1 to 10% by weight of polyvinylpyrrolidone.

According to the powder for molding of the present invention, the following excellent effects can be obtained.

(1) The powder is totally homogeneous because each particle contains all predetermined components, and thus, in particular, the uniformity of adhesive strength can be improved. As a result, while a molded article produced from a conventional powder partially has an insufficient strength area and thus a corner part or a convex part readily falls off or is readily destroyed, the present invention can provide a molded article having strong such parts and can produce a molded article having a complex shape with higher precision.

In particular, when a water-soluble inorganic salt is used as the inorganic component, a powder having higher uniformity (content uniformity of components) can be produced by spray drying, and thus there is a further advantage in the adhesive strength or the like.

Furthermore, when the powder of the present invention is a powder including particles in which an inorganic component (especially, a water-soluble inorganic salt) and a water-soluble organic polymer component are uniformly distributed over each particle, a molded article providing higher strength can be obtained. In particular, when a water-soluble inorganic salt (specifically, sodium chloride) is used as the inorganic component, a molded article can provide higher strength than that from a coated powder whose components are locally distributed in each particle of the powder, as described in Examples later.

(2) The molded article according to the present invention has better color reproducibility than that of a molded article produced from a conventional mixed powder. That is, the powder for molding of the present invention can provide a molded article that has the same color as or a similar color to that of a predetermined sample. Furthermore, bleeding when a molded article is painted can be reduced or prevented, and thus excellent reproducibility can be provided in the point.

(3) In a conventional mixed powder, the particles do not have a spherical shape, and thus the powder has low flowability, planar spreading properties, and the like, and has disadvantages in a producing process. Moreover, when the powder particles are spread on a flat surface, a defect such as lines may be caused on the planar spread face due to the unevenness of the powder. In contrast, the powder for molding of the present invention, especially the powder obtained by spray drying, has almost spherical particles, and thus has excellent fluidity, planar spreading properties, and the like. Furthermore, it is readily close-packed in a flatly spread surface to give a dense distribution. Thus, a molded article can be obtained more smoothly, and a high-quality molded article without any defects such as lines can be obtained as well.

(4) The powder for molding of the present invention, especially the powder obtained by spray drying, has a narrow particle size distribution (relatively uniform particle diameter), and its particle diameter can be arbitrarily controlled depending on a spray condition. Thus, the particle size can be set in a range where little dust is generated even under a spray pressure of a spray solution during molding. In this manner, the powder of the present invention can provide better effect on working environment and handling than that of a conventional powder.

BRIEF DESCRIPTION OF THE SEVERAL VIEWS OF THE DRAWING

FIG. 1 is a schematic view of a production process when a molded article is produced by Rapid Prototyping.

[FIG. 2] FIGS. 2 are views each showing the result of SEM observation of the powder in Example 1 or Comparative Example 1.

[FIG. 3] FIGS. 3 are views each showing the result of element distribution of sodium or magnesium in the powder in Example 1 or Comparative Example 1 using an energy dispersive X-ray spectrometer (EDS).

FIGS. 4 are views each showing the particle size distribution of the powder in Example 1 or Comparative Example 1.

FIG. 5 is a schematic view showing a method for measuring angle of repose.

[FIG. 6] FIGS. 6 are views each showing the result of infrared absorption spectrum measurement on the powder in Example 1 or Comparative Example 1.

FIGS. 7 are views showing the SEM observation result and particle size distribution of the powder obtained in Example 2.

FIGS. 8 are views showing the SEM observation result and particle size distribution of the powder obtained in Example 3.

FIGS. 9 are views showing the SEM observation result and particle size distribution of the powder obtained in Example 4.

FIGS. 10 are views showing the SEM observation result and particle size distribution of the powder obtained in Example 5.

FIGS. 11 are views showing the SEM observation result and particle size distribution of the powder obtained in Example 6.

[FIG. 12] FIGS. 12 are views showing the SEM observation result and particle size distribution of the powder obtained in Example 7.

[FIG. 13] FIGS. 13 are views showing the SEM observation result and particle size distribution of the powder obtained in Example 8.

FIGS. 14 show a secondary electron image (middle view) and the result of element distribution by line analysis (upper view and lower view) of a cross section of the powder obtained in Example 9. The lower view is a chart in which the vertical axis (strength) showing the distribution frequency of a carbon element in the upper view is enlarged.

[FIG. 15] FIGS. 15 show a secondary electron image (middle view) and the result of element distribution by line analysis (upper view and lower view) of a cross section of the coated powder obtained in Test Example 3. The lower view is a chart in which the vertical axis (strength) showing the distribution frequency of a carbon element in the upper view is enlarged.

FIGS. 16 show a secondary electron image (middle view) and the result of element distribution by line analysis (upper view and lower view) of a cross section of the comparative powder obtained in Test Example 3. The lower view is a chart in which the vertical axis (strength) showing the distribution frequency of a carbon element in the upper view is enlarged.

FIG. 17 is a graph showing each strength of a tablet of the powder obtained in Example 9 and a tablet obtained from the coated powder.

Figure 1:
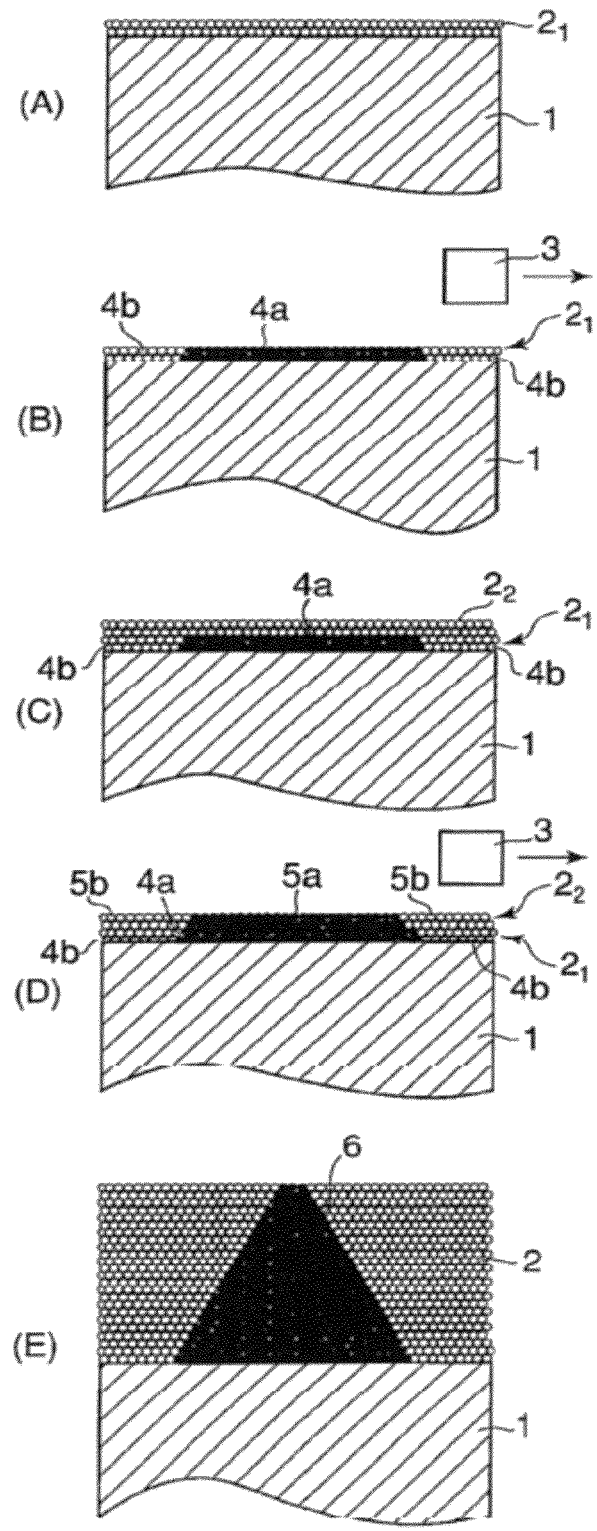
[FIG. 1]

| Reference Signs List | |
|---|---|
| 1 | table |
| 2 | powder layer |
| 2₁ | powder layer |
| 2₂ | powder layer |
| 3 | three-dimensional printer |
| 4a | sprayed area |
| 4b | unsprayed area |
| 5a | sprayed area |
| 5b | unsprayed area |
| 6 | molded article |

DETAILED DESCRIPTION OF THE INVENTION

1. Powder for Molding

The powder for molding of the present invention (the powder of the present invention) is a powder including particles in which each particle contains an inorganic component and a water-soluble organic polymer component.

The powder of the present invention has characteristics that each particle in the powder contains both an inorganic component and a water-soluble organic polymer component, unlike a conventional mixed powder. That is, each particle constantly includes both components, thus the powder is totally uniform in every part, and each component has little unevenness in the content distribution. Thus, when the powder is used for molding (for Rapid Prototyping (in particular, for powder-layered manufacturing process using an adhesive)), uniform adhesive strength, coloring properties, and the like can be realized, and therefore reproducibility can be obtained with high precision.

Furthermore, in the particles included in the powder of the present invention, it is preferable that the inorganic component and the water-soluble organic polymer component are homogeneously distributed in each particle. In particular, when a water-soluble inorganic salt (preferably sodium chloride) is employed as the inorganic component, the obtained molded article can provide a higher strength than that from a coated powder (a powder including particles that have a surface coated with an adhesive component).

The inorganic component may be either a water-soluble inorganic component or a water-insoluble inorganic component (including a low water-soluble inorganic component). For example, preferably used is at least one of inorganic acid salts of metals (such as halides, sulfates, carbonates, nitrates, and phosphates), metal oxides, and metal hydroxides. Examples of the water-soluble inorganic component include:

alkali metal halides such as sodium chloride, potassium chloride, sodium iodide, and sodium bromide; alkaline earth metal halides such as calcium chloride and magnesium chloride; and sulfates such as magnesium sulfate.

Examples of the water-insoluble inorganic component include: alkaline earth metal phosphates such as hydroxyapatite, calcium phosphate, and β-tricalcium phosphate (β-TCP); oxides such as silica, alumina, and zirconia; and hydroxides such as calcium hydroxide, titanium hydroxide, and zirconium hydroxide. The water-insoluble inorganic component may be mixed as an anticaking agent for a water-soluble inorganic component. For example, calcium phosphate and the like may be suitably used as the anticaking agent for sodium chloride and the like. In this case, the content of the anticaking agent is 10% by weight or less, preferably 5% by weight or less, and more preferably 1 to 5% by weight, in an inorganic component.

In the powder (particles) for molding of the present invention, the content of an inorganic component is suitably changed depending on, for example, the type of an inorganic component used, and is usually more than 50% by weight and specifically preferably 70% by weight or more. For example, when a water-soluble inorganic salt (specifically, sodium chloride) is used as the inorganic component, it is more preferable that the content is within a range from 60 to 95% by weight, and specifically from 70 to 95% by weight. When the content is set within the range, a desired molded article can be obtained with increased reliability.

In the present invention, two or more inorganic components are preferably employed as the inorganic component. For example, a water-soluble inorganic salt other than magnesium sulfate is preferably used as the first inorganic component. Specifically, alkali metal salts such as sodium chloride and potassium chloride, and alkaline earth metal salts such as calcium chloride, calcium sulfate, and magnesium chloride may be used. In this case, sodium chloride is preferred as the first inorganic component. Furthermore, magnesium sulfate is preferably used as the second inorganic component. In this case, the content of the second inorganic component is preferably 50% by weight or less with respect to the first inorganic component. Specifically, the weight ratio of the first inorganic component and second inorganic component (where the total weight is regarded as 100% by weight) is 99.5:0.5 to 50:50 and more preferably 99.5:0.5 to 75:25. Most preferably, the content of the first inorganic component is 3 to 20 parts by weight based on 1 part by weight of the second inorganic component.

As the water-soluble organic polymer component, any polymer component having characteristics capable of bonding powder particles to each other in the presence of water may be used, and adhesive components used in known Rapid Prototyping may be also employed. For example, at least one of 1) polyvinylpyrrolidone (PVP), polyvinyl alcohol (PVA), polyethylene glycol (PEG), polyvinyl acetate, polyvinyl butyral, polyacrylic acid, sodium polyacrylate, a copolymer of sodium polyacrylate and maleic acid, and a copolymer of polyvinylpyrrolidone and vinyl acetate, 2) cellulose derivatives (such as methyl cellulose, ethyl cellulose, ethyl hydroxymethyl cellulose, carboxymethyl cellulose (CMC), sodium carboxymethyl cellulose, hydroxypropyl cellulose (HPC), and hydroxypropyl methyl cellulose (HPMC)), 3) gum arabic, locust bean gum, gelatin, starch, sucrose, dextrose, fructose, lactose, wheat flour, alginic acid, and sodium alginate, and 4) citric acid and succinic acid may be used. Among them, at least one of polyvinylpyrrolidone, carboxymethyl cellulose, hydroxypropyl cellulose, and sodium alginate is preferably used because they have dispersibility that reduces aggregation of a powder itself and characteristics that improve fluidity and thus can further improve the planar spreading properties of powder.

The powder for molding of the present invention can have any composition in which such components above are variously mixed. For example, a powder in which each particle includes sodium chloride, polyvinylpyrrolidone, and magnesium sulfate may be used as the powder for molding of the present invention. For example, a powder in which each particle includes hydroxyapatite, polyvinylpyrrolidone, and magnesium sulfate may be also used as the powder for molding of the present invention.

In the powder (particle) for molding of the present invention, the content of a water-soluble organic polymer component is not limited. However, it is preferable that the content is usually 0.1 to 30% by weight, specifically 0.5 to 15% by weight, and more specifically 1 to 10% by weight. When the content is set within the range, a molded article obtains higher strength, and thus a molded article that is hardly destroyed can be reliably obtained. Simultaneously, a molded article obtains higher resistance to heat to which it is exposed when used as a core for casting, moreover the degree of shrinkage can be reduced, and thus a molded article can be formed with even higher precision.

Specific examples of preferred composition of the powder of the present invention include a composition containing 70 to 90% by weight (preferably 75 to 85% by weight) of sodium chloride, 5 to 25% by weight (preferably 10 to 20% by weight) of magnesium sulfate, and 1 to 10% by weight (preferably 2 to 8% by weight) of polyvinylpyrrolidone. When the composition is set as above, a molded article having higher strength can be obtained. In particular, when sodium chloride, magnesium sulfate, and polyvinylpyrrolidone are uniformly distributed in one particle, the obtained molded article can provide even higher strength. That is, a molded article that has a higher strength than that from the coated powder as above can be provided.

The average particle diameter of the powder for molding of the present invention can be suitably set depending on the shape of a predetermined molded article, desired reproducibility, or the like. It is preferable that the average particle diameter is usually 350 μm or less and specifically 10 to 150 μm. Furthermore, in order to increase the density of a molded article and to closely pack the powder for molding in a planar spread face to increase the density of a molded article, two or more powders having different average particle diameters from each other may be mixed for use.

In the powder for molding of the present invention, the particles usually have an approximately spherical shape. However, a trace amount of particles having other shapes may be included as long as they do not interfere with flowability and the like.

The powder for molding of the present invention may be produced by any method as long as a powder including particles in which each particle contains all components can be obtained. In particular, spray drying is preferable to produce the powder for molding of the present invention. More specifically, a liquid raw material including the inorganic component and the water-soluble organic polymer component is spray-dried to produce the powder for molding of the present invention.

The liquid raw material can be prepared by dissolving or dispersing an inorganic component and a water-soluble organic polymer in a solvent. In this case, when the solvent is water and the inorganic component is water-soluble, an aqueous solution in which both of the components are dissolved can be obtained. When the inorganic component is water-insoluble, the obtained mixed liquid is an aqueous solution in which the water-soluble organic polymer is dissolved and in which the inorganic component is dispersed. When preparing the liquid raw material, any solvent capable of dissolving or dispersing powdery components can be used, but usually water may be used.

The concentration (solid content) of the liquid raw material may be suitably controlled to a concentration capable of efficiently spray drying, but is usually about 5 to 30% by weight.

The spray drying can be performed using a known or commercially available spray dryer, and the condition may be suitably set within the range of running condition of the apparatus. When using a common apparatus, for example, the number of rotation may be 10000 to 40000 rpm, the inlet temperature may be 150 to 500° C., and the outlet temperature may be 70 to 300° C.

As necessary, the obtained powder may be classified by a known method for controlling the particle size. From viewpoints of fluidity, planar spreading properties, and the like, the obtained powder is preferably used for molding without any process (such as pulverization) that changes an approximately spherical particle shape.

The powder for molding of the present invention can be used for various molding. In particular, it can be suitably used for Rapid Prototyping. For example, it can be used as a powder for molding for powder adhesion method. The most preferred embodiment is an embodiment used as a powder in the following method for producing a molded article.

2. Method for Producing Molded Article

The producing method of the present invention is a method for producing a molded article from a powder. The method is characterized by including a step (a) of flatly spreading a powder for molding including particles to form a powder layer, each particle containing an inorganic component and a water-soluble organic polymer component to form a powder layer, and thereafter spraying a spray liquid containing at least one of a water-miscible organic solvent and water onto a predetermined area in the powder layer to make the binding strength among powder particles in the sprayed area higher than the binding strength among powder particles in the unsprayed area; a step (b) of further flatly spreading the powder for molding on the powder layer after spray to form an upper powder layer, and thereafter spraying the spray liquid onto a predetermined area in the upper powder layer to make the binding strength among powder particles in the sprayed area higher than the binding strength among powder particles in the unsprayed area; a step (c) of repeating the step (b) once or more times to form a molded article including a laminated body consisting of the sprayed areas; and a step (d) of removing the molded article from the powder.

The producing method of the present invention can be carried out by a known Rapid Prototyping (powder adhesion method) except that the powder for molding of the present invention is used as a powder. Hereinafter, each step will be described.

Step a

In the step a, a powder for molding including particles in which each particle contains an inorganic component and a water-soluble organic polymer component is spread on a flat surface to form a powder layer, and then a spray liquid containing at least one of a water-miscible organic solvent and water is sprayed onto a predetermined area in the powder layer to make the binding strength among powder particles in the sprayed area higher than the binding strength among powder particles in the unsprayed area.

When the powder for molding is planar spread, it may be spread on a member having a flat surface, such as a table and a flat plate. The material of the member is not limited as far as the powder for molding does not adhere, and for example, a metallic member or a ceramic member may be used.

When the powder is planar spread to form a powder layer (upper powder layer), the thickness of the powder layer can be optionally controlled depending on desired reproducibility or the like. The thickness is usually within a range from about 50 to 200 μm per layer.

For the spray liquid, a spray liquid containing at least one of a water-miscible organic solvent and water is used. In particular, the spray liquid containing, as a solvent, at least one of a water-miscible organic solvent and water is used. In the present invention, the spray liquid preferably has a function that reduces or prevents bleeding or diffusion of a sprayed area when the spray liquid is sprayed onto a spread powder layer (upper powder layer). For such water-miscible organic solvent, for example, at least one of: alcohols such as ethanol, methanol, and propanol; ketones such as acetone, methyl ethyl ketone, methyl propyl ketone, and isopropyl ketone; and carboxylic esters such as methyl acetate and ethyl acetate can be suitably used.

The water-miscible organic solvent may be used as a mixed solution with water. In this case, the mixing ratio of a water-miscible organic solvent and water is preferably within a range from 5:95 to 75:25 based on weight ratio.

In the present invention, the spray liquid may include other components. For example, a colorant may be included. In the case that the colorant is contained, when it is sprayed onto the powder layer (upper powder layer), the sprayed area is colored to provide the following advantages such as: a) discrimination is improved between the sprayed area and the unsprayed area; b) discontinuation of spray through a nozzle can be visualized, and thus nozzle failure can be found early; c) workability for removing an unsprayed area can be improved when the molded article is taken out from the powder; and d) the dimensional precision of a mold (molded artifact) obtained from the powder can be increased. Furthermore, as an embodiment when a colorant is contained, the spray of a spray liquid can be carried out by color print, and consequently not only the three-dimensional shape of a sample but also the color can be reproduced.

In the step a, the spray amount of the spray liquid is not specifically limited, and it may be a sufficient amount by which the powder particles in a sprayed area are bonded to each other (in the below steps, however, sufficient amounts by which the powder particles in a sprayed area are bonded to each other and the powder particles in an upper layer are bonded to the powder particles in a lower layer are included as well).

In the step a, by spraying the spray liquid onto a predetermined area in the powder layer, the binding strength among particles in the sprayed area is made higher than the binding strength among particles in the unsprayed area. In particular, the binding strength among particles in the unsprayed area is not limited as long as a laminate body (molded article) formed from the sprayed areas can be removed from the powder, but it is preferable that the binding strength among particles in the unsprayed area is not manifested.

In the step a, as necessary, the sprayed area may be dried by heating after spraying the spray liquid. Thus, the obtained molded article can have an increased dimensional precision.

Step b

In the step b, the powder for molding is further planar spread on the powder layer after spraying to form an upper powder layer, and then the spray solution is sprayed onto a predetermined area in the upper powder layer to make the binding strength among powder particles in the sprayed area higher than the binding strength among powder particles in the unsprayed area.

Onto the powder layer formed in the step a, the powder for molding is further planar spread to form an upper powder layer. In this case, it is preferable that the thickness of the upper powder layer (upper layer) is the same as that of the previously formed powder layer (lower layer) (the thicknesses are constant).

In the step b, as necessary, the sprayed area may be dried by heating after spraying the spray liquid. Thus, the obtained molded article can have an increased dimensional precision.

Step c

In the step c, the step b is repeated once or more times to form a molded article including a laminated body composed of the sprayed areas.

That is, in the step c, the powder for molding is flatly spread on the upper powder layer to form the second upper powder layer, and the spray liquid is sprayed onto a predetermined area in the upper powder layer to make the binding strength among powder particles in the sprayed area higher than the binding strength among powder particles in the unsprayed area. In a similar manner, the third upper powder layer, the fourth upper powder layer, and finally the n-th upper powder layer are formed. That is, the step b is repeated to laminate the powder layers until a desired molded article is obtained.

In the powder-layered manufacturing process of the step a to step c, the nozzle spraying of a spray solution may be performed by, for example, cutting data prepared using a three-dimensional CAD into slices having a desired thickness to transform cross sectional data, spraying the spray liquid onto a planar spread powder layer using a three-dimensional printer having a nozzle based on the cross sectional data of the bottom part (lowest part), and further spraying the spray liquid onto the upper powder layer based on the cross sectional data of the upper layer on the bottom part. Such process is sequentially performed to form a molded article including a laminated article of the powder layers.

Step d

Subsequently, the molded article is removed from the powder. For example, the powder for molding in the unsprayed area is separated from the molded article to collect the molded article.

As necessary, the obtained molded article may be treated with heat for further increasing the strength. The strength can be increased by drying, film formation, and the like, through the heat treatment. The temperature for heat treatment is usually 150° C. or less and can be set within the range.

In the present invention, the strength can be also increased by coating an adhesive component on a surface of the obtained molded article. Usable examples of such adhesive component include the water-soluble organic polymers above as well as cyanoacrylate adhesives (including instantaneous adhesives), polyethylene resins, and urethane resins. When coating, the surface of a molded article may be coated with, for example, a solution or a dispersion liquid containing an adhesive component, and then dried. Examples of the coating method include a method with a spray or a brush and a method by impregnation or immersion as well as a method by printing.

<Embodiment>

Hereinafter, an embodiment of the method for producing a molded body in the present invention will be described with reference to drawings.

First, as shown in FIG. 1(A), the powder for molding of the present invention is planar spread on a table 1 to form a powder layer $2_1$. Subsequently, as shown in FIG. 1(B), onto the powder layer $2_1$, a spray liquid containing at least one of a water-miscible organic solvent and water is printed (sprayed) based on the bottom part of the cross sectional data described above with a three-dimensional printer 3 having a nozzle. At this time, the binding strength among powder particles present in a sprayed area 4a in the powder layer $2_1$ becomes higher than the binding strength among powder particles present in an unsprayed area 4b.

In this case, as the powder for molding, for example, a powder having the preferred composition above can be suitably used. That is, a powder for molding containing 70 to 90% by weight (preferably 75 to 85% by weight) of sodium chloride, 5 to 25% by weight (preferably 10 to 20% by weight) of magnesium sulfate, and 1 to 10% by weight (preferably 2 to 8% by weight) of polyvinylpyrrolidone can be used. More specifically, as described in the example below, for example, a powder for molding containing 80% by weight of sodium chloride, 15% by weight of magnesium sulfate, and 5% by weight of polyvinylpyrrolidone can be preferably used.

Next, as shown in FIG. 1(C), on the powder layer $2_1$ after spraying, the powder for molding of the present invention is further flatly spread to form an upper powder layer $2_2$. Subsequently, as shown in FIG. 1(D), onto the spread upper powder layer $2_2$, the spray liquid is printed (sprayed) based on the cross sectional data described above (the cross sectional data upper next to the bottom part) with the three-dimensional printer 3 having a nozzle. At this time, the binding strength among powder particles present in a sprayed area 5a in the upper powder layer $2_2$ becomes higher than the binding strength among powder particles in an unsprayed area 5b. Simultaneously, the sprayed area 5a is bonded to the lower sprayed area 4a.

Next, the steps in FIGS. 1(C) and 1(D) are repeated. In the steps, each powder layer (upper powder layer) sprayed with the spray liquid is sequentially printed (sprayed) based on each cross sectional data of the third and subsequent layers with the three-dimensional printer having nozzles. By such powder-layered manufacturing process, a molded article 6 having a pyramid shape that is formed from the sprayed areas by a plurality of times of spray can be obtained as shown in FIG. 1(E). The molded article 6 can be taken out by removing the powder in the unsprayed area (or by separating the molded article from the powder in the unsprayed area).

As necessary, the molded article may be dried at a temperature of 200° C. or less before or after separating the molded article from the powder. As necessary, the obtained molded article may be heat-treated at a temperature equal or higher than the temperature at which a water-soluble organic polymer component is burned down and within a temperature range where an inorganic component does not melt. In this case, the heat treatment atmosphere may be in the air, in an oxidative atmosphere, in an inert gas atmosphere, or under vacuum, and may be properly selected depending on, for example, the type of an inorganic component.

The molded article obtained from the powder for molding of the present invention has excellent homogeneity. For example, the molded article has almost homogeneous strength (adhesive strength), density (porosity), coloring properties, and the like in any area and is excellent in reproducibility. On this account, an actual molded article (three-dimensional shape model) can be reconstructed with higher precision from, for example, an existing shape, a three-dimensional shape with colors, and a three-dimensional shape produced by a desired design. Such molded article can be used in various fields such as the production of master models, the production of molds, the field of precision instruments, and the medical field. For example, a three-dimensional model (such as organs of an organism) can be produced based on image data obtained by CT scan and the like. Furthermore, a molded article having an arbitrary shape is produced as a core (that is, as a molded article to disappear), and immersed in a resin such as a biological water absorbing polymer. After the resin is cured, the molded article is removed to form an image (cavity) having the precise shape of the molded article in the resin.

EXAMPLES

Hereinafter, the features of the present invention will be described in further detail with reference to examples and comparative examples. However, the scope of the invention is not limited to the examples.

Example 1

An aqueous solution was obtained by dissolving 3600 g of sodium chloride added with 2% of calcium phosphate (a compounding ratio of 90% by weight), 200 g of polyvinylpyrrolidone ("PVP-K90" manufactured by ISP Japan Ltd.) (a compounding ratio of 5% by weight), and 200 g of anhydrous magnesium sulfate (a compounding ratio of 5% by weight) in 16000 g of water. The aqueous solution was used as a spray liquid. The spray liquid was sprayed using a commercially available spray dryer ("L-8" manufactured by OHKAWARA KAKOHKI Co., Ltd.). The spray conditions at this time were as follows; inlet temperature: 240° C.; outlet temperature: 140° C.; atomizer rotation speed: 30000 rpm; air flow: 1.0 kpa; and liquid flow rate: pump ("ROLLER PUMP RP-1000" manufactured by EYELA) rotation speed 25 rpm (about 50 ml/min). In this manner, a powder was obtained.

Comparative Example 1

A mixed powder having the same composition as that of Example 1 was prepared by dry blending using the same materials as those in Example 1 except that "PVP-K30" manufactured by ISP Japan Ltd. was used as polyvinylpyrrolidone.

Test Example 1

The following characteristics were examined on each powder (sample) obtained in Example 1 and Comparative Example 1.

(1) Observation of Secondary Electron Image (SEM Image)

A sample was fixed on a carbon tape and subjected to gold evaporation to prepare a sample for observation. As for the observation, a scanning electron microscope ("JSM-5500 LV" manufactured by JEOL Ltd.) was used to obtain a secondary electron image (SEM image) at an acceleration voltage of 15 kV. The results are shown in FIGS. 2 (FIG. 2(a) shows the result of Comparative Example 1 and FIG. 2(b) shows that of Example 1).

(2) Observation of Element Distribution

A sample was fixed on a carbon tape and subjected to gold evaporation to prepare a sample for observation. As for the observation, a scanning electron microscope ("JSM-5500 LV" manufactured by JEOL Ltd.) was used to obtain a secondary electron image (SEM image) at an acceleration voltage of 15 kV, and then an energy dispersive X-ray spectrometer (EDS; "JED-2200" manufactured by JEOL Ltd.) was used to observe each element distribution of sodium and magnesium at an acceleration voltage of 15 kV. The results are shown in FIGS. 3. From FIGS. 3 (FIG. 3(a) shows the result of Comparative Example 1, and FIG. 3(b) shows that of Example 1), it was found that each distribution of sodium and magnesium was uneven in Comparative Example 1. In contrast, it was revealed in Example 1 that sodium and magnesium were present in each particle and were generally uniformly distributed.

(3) Bulk Density

Into a 50 mL-graduated cylinder, 10 g of a sample was placed, and the graduated cylinder was set in a tapping machine ("TMP-7-P" manufactured by TSUTSUI SCIENTIFIC INSTRUMENTS CO., LTD.). A test was performed in the test conditions of a number of tapping of 100, a tapping height of 4 cm, and a tapping speed of 36 times/minute, and then the volume F (mL) was visually determined. Then, the bulk density (g/mL) was calculated according to the calculation formula of 10/F. The results are shown in Table 1.

TABLE 1

|  | Example 1 | Comparative Example 1 |
| --- | --- | --- |
| Bulk density, g/mL | 0.71 | 1.1 |
| Drying loss (water content), % | 1.9 | 0.6 |
| Friability, % | 27.7 | 51.8 |
| Angle of repose, degree | 37 degree | 50 degree |

(4) Particle Size Distribution and Average Particle Diameter

Figure 4A:
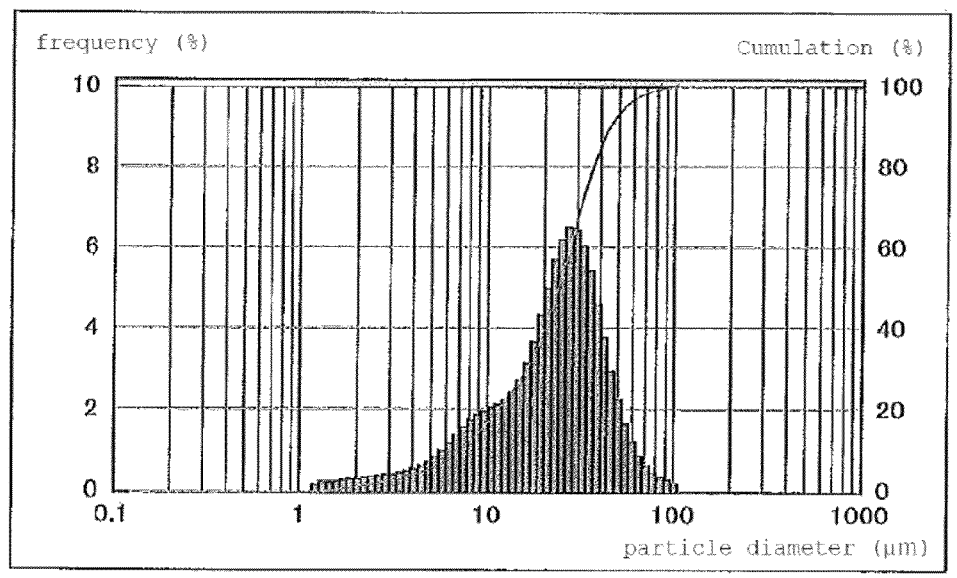
[FIG. 4]
Figure 4B:
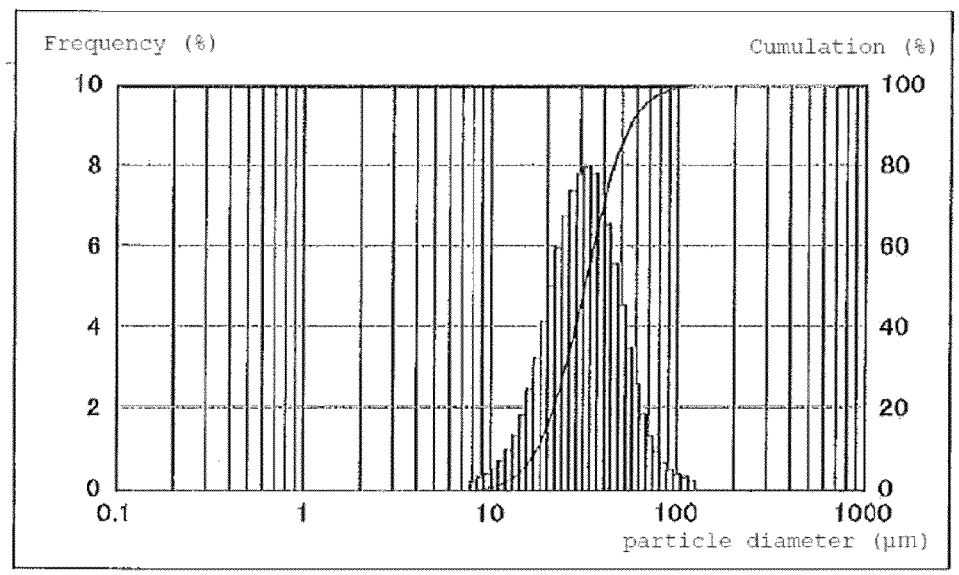

A sample was dispersed in acetone and measurement was performed by laser diffractometry in an acetone solvent. As a measurement equipment, "MICROTRAC ERA Model No. 9320-X100" manufactured by Honeywell International Inc. was used. The results are shown in FIGS. 4; (FIG. 4(a) shows the result of Comparative Example 1 and FIG. 4(b) shows that of Example 1). As apparent from FIGS. 4, in Comparative Example 1, a distribution having a distribution maximum at about 30 µm overlapped a distribution having a distribution maximum at about 10 µm, and thus the particle size distribution was broad. In contrast, in Example 1, a single particle size distribution having a distribution maximum at about 30 µm was observed and was almost normal distribution.

(5) Drying Loss (Water Content)

A weighing bottle was previously dried for 30 minutes, and the mass was accurately weighed. Into the bottle, 1.0 g of a sample was accurately weighed. The entirety was placed in a dryer and dried at 105° C. for 3 hours. After drying, the bottle was taken out from the dryer and allowed to cool in a desiccator (silica gel), and then the mass was accurately weighed. Drying loss was calculated according to the below formula. The results are shown in Table 1.

Drying loss (%)=(weight before drying–weight after drying)/weight before drying (6) Magnesium Content About 1.0 g of a sample was accurately weighed, 4.0 mL of diluted hydrochloric acid was added to dissolve the sample, and water was added to make the volume exactly 100 mL. To the solution, 5 mL of pH 10.7 ammonia-ammonium chloride buffer solution was added, and the mixture was titrated with 0.05 mol/L disodium dihydrogen ethylenediaminetetraacetate solution (indicator: 0.04 g of Eriochrome Black T-sodium chloride indicator). Magnesium content was calculated from the titer using the below formula and converted into magnesium sulfate content. The results are shown in Table 2. As shown in Table 2, in Example 1, magnesium content had less variation (smaller standard deviation) as compared with that in Comparative Example 1, and thus it is revealed that the content uniformity was kept constant.

0.05 mol/L disodium dihydrogen ethylenediaminetetraacetate solution 1 mL=2.015 mg MgO Magnesium content (%)=(titer ml×2.015×$f$(factor of titration solution)/sample weight mg)×100

TABLE 2

|  | Example 1 | Comparative Example 1 |
|---|---|---|
| Magnesium sulfate content (%) | 5.50 | 7.20 |
|  | 5.35 | 6.36 |
|  | 5.22 | 6.81 |
| Mean value | 5.36 | 6.79 |
| Standard deviation | 0.140 | 0.420 |
| CV | 2.62 | 6.79 |

(7) Friability

First, each powder of Example 1 and Comparative Example 1 was used to produce a molded test piece (rectangular solid with dimensions of 42 mm×15 mm×15 mm) with a commercially available molding apparatus. A mixed solution of ethanol/water (50 parts by weight/50 parts by weight) was used as a spray liquid. Next, into a tester (Friability Tester manufactured by Kayagaki Irika Kogyo Co., Ltd.) according to the friability test described in the Japanese Pharmacopoeia, the molded test piece (rectangular solid with dimensions of 42 mm×15 mm×15 mm) previously weighed and 20 pieces of alumina balls having a diameter of 1 cm were placed. The tester was operated at 25 rpm for 20 minutes, and the molded test piece after test was weighed. The results are shown in Table 1. As apparent from the results in Table 1, the friability in Example 1 was lower than that in Comparative Example 1, and thus it is revealed that the molded article has higher strength.

Friability (%)=100−(weight after test/weight before test)×100

(8) Angle of Repose

Figure 5:
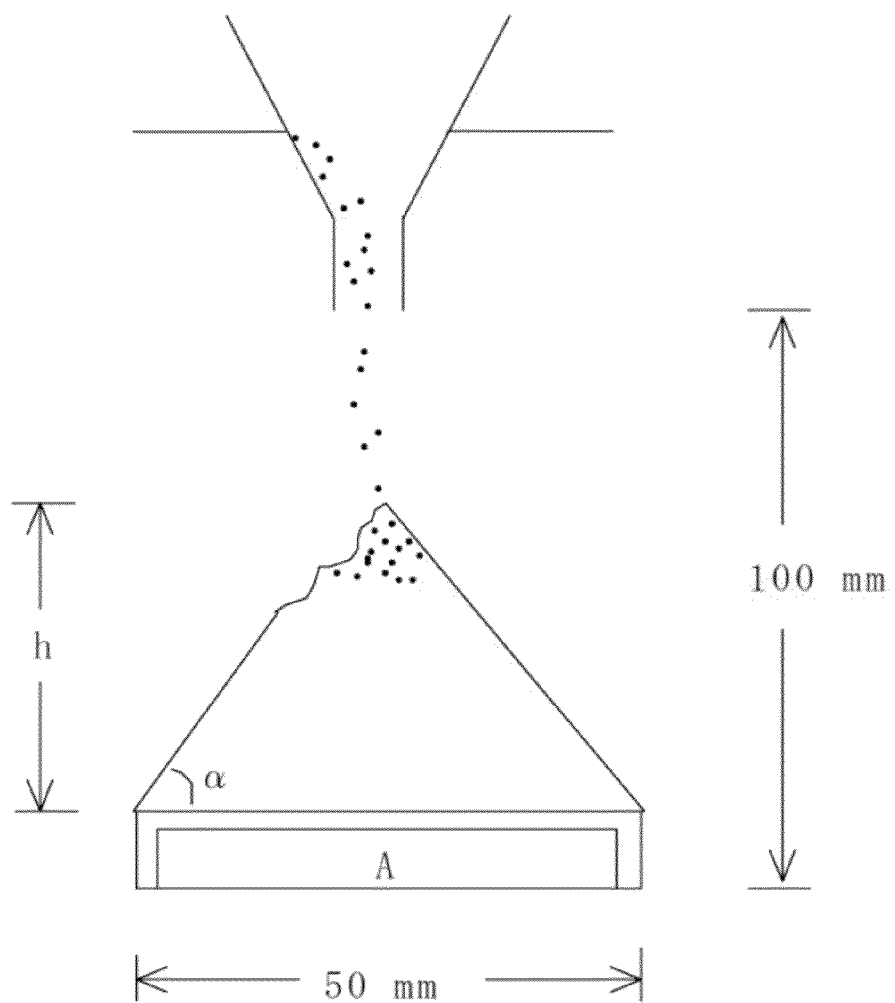
[FIG. 5]
Figure 7:
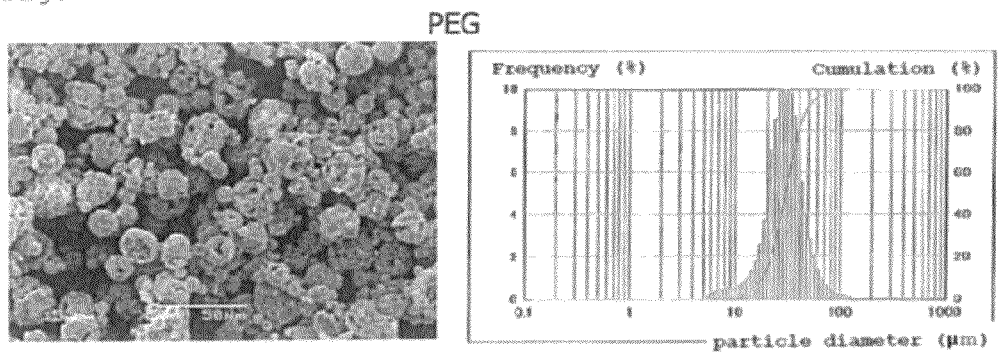
[FIG. 7]
Figure 8:
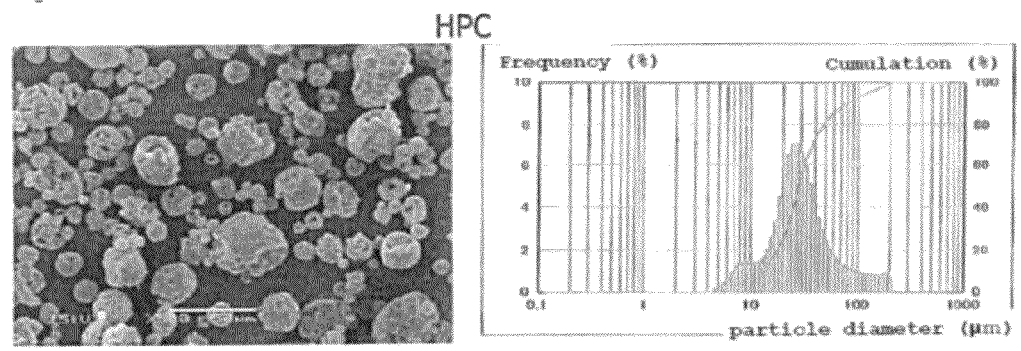
[FIG. 8]
Figure 9:
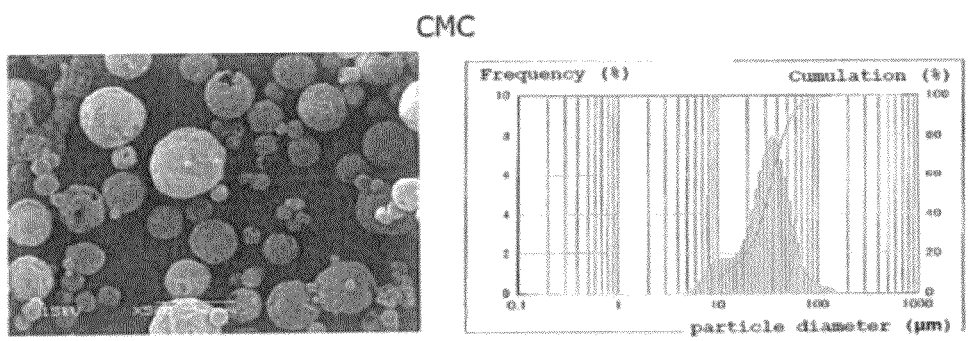
[FIG. 9]
Figure 10:
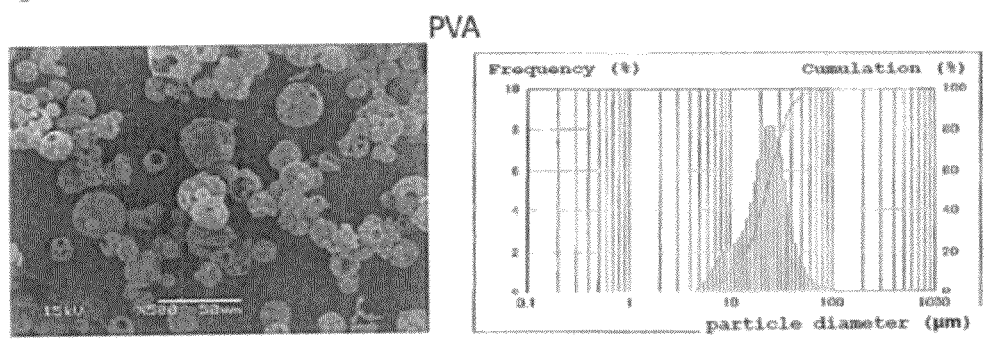
[FIG. 10]
Figure 11:
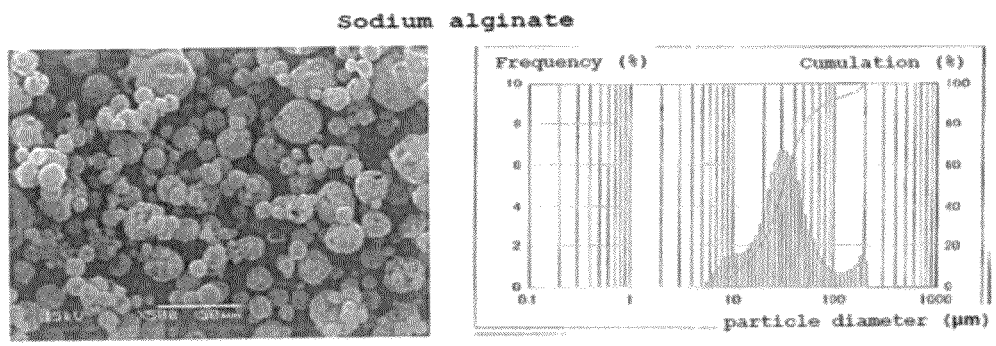
[FIG. 11]

As shown in FIG. 5, particles were slowly dropped from a height of 100 mm onto a dish having a diameter of 50 mm. When the height (h) became constant, h was measured, and the angle of repose was calculated from α=tan$^{-1}$(h/25). The results are shown in Table 1. As shown in Table 1, the angle of repose in Example 1 was smaller than that in Comparative Example 1, and thus it is revealed that the fluidity was higher and the planar spreading properties were better than those of a conventional powder.

(9) Measurement of Infrared Absorption Spectrum (Measurement of PVP)

Using an infrared microspectrometer (ILLUMINAT IR manufactured by Smiths), a sample was closely attached onto a diamond Attenuated Total Reflection (ATR) prism face, and the reflectance spectrum was recorded with a scan number of 64 (ATR method). The results are shown in FIGS. 6 (the upper and lower views in FIG. 6(a) show the result from Comparative Example 1, and FIG. 6(b) shows the result from Example 1). As apparent from the results in FIGS. 6, infrared absorption peaks derived from PVP were observed in each case in Example 1, and thus it is revealed that PVP is contained in each particle. In contrast, in Comparative Example 1, the peak shapes varied depending on the recorded points, and no infrared absorption peak derived from PVP was observed in some cases. Thus, it is revealed that PVP is not present in each particle.

(10) Examination of Coloring Properties

A double-sided adhesive tape was stuck onto a piece of paper for inkjet printer (Super Fine Paper manufactured by SEIKO EPSON CORRPORATION). A sample was charged on one side of the tape, and the excess sample was removed. A nozzle check pattern was printed on the sample using an inkjet printer ("iP4200" manufactured by Canon. Inc). The coloring properties, bleeding, and the like of inks were visually compared with those of a printed pattern on paper for inkjet printer. Randomly selected five adult males and five adult females were asked to visually evaluate on the below evaluation items. The results are shown in Table 3. As shown in Table 3, the evaluations are better in Example 1 than those in Comparative Example 1 from both males and females, and thus it is revealed that the coloring properties and bleeding are improved in Example 1 as compared with Comparative Example 1.

<Evaluation Item>

A. When comparing the color printed on normal paper with the color printed on the sample, which better reproduced the coloring properties on paper for inkjet printer?

B. Which sample caused less ink bleeding where a grid pattern was printed?

<Evaluation>

Example 1 is obviously better than Comparative Example 1: "5"

Example 1 is slightly better than Comparative Example 1: "4"

Example 1 is equivalent to Comparative Example 1: "3"

Example 1 is slightly worse than Comparative Example 1: "2"

Example 1 is obviously worse than Comparative Example 1: "1"

TABLE 3

| Evaluation item |  | A | B |
|---|---|---|---|
| Male | 1 | 4 | 5 |
|  | 2 | 3 | 5 |
|  | 3 | 3 | 5 |
|  | 4 | 5 | 5 |
|  | 5 | 5 | 5 |
| Female | 1 | 5 | 4 |
|  | 2 | 4 | 5 |
|  | 3 | 5 | 5 |
|  | 4 | 4 | 5 |
|  | 5 | 5 | 5 |

Examples 2 to 6

A powder was prepared by spray drying in the same manner as in Example 1 except that polyethylene glycol (PEG) (Example 2), hydroxypropyl cellulose (HPC) (Example 3), carboxymethyl cellulose (CMC) (Example 4), polyvinyl alcohol (PVA) (Example 5), or sodium alginate (Example 6) was used in place of polyvinylpyrrolidone. Each obtained powder was subjected to the tests (2) and (4) in Test Example 1. The results are shown in FIG. 7 to FIG. 11. As apparent from these results, each powder for molding of the present invention includes comparatively fine particles having a spherical shape, and thus is specifically suitable for powder-layered manufacturing process using an adhesive.

Example 7

An aqueous solution was obtained by dissolving 3600 g of sodium chloride added with 2% of calcium phosphate (a compounding ratio of 60.1% by weight), 2000 g of hydroxyapatite (a compounding ratio of 33.3% by weight), 200 g of polyvinylpyrrolidone ("PVP-K90" manufactured by ISP Japan Ltd.) (a compounding ratio of 3.3% by weight), and 200 g of anhydrous magnesium sulfate (a compounding ratio of 3.3% by weight) in 14000 g of water. The aqueous solution was used as a spray liquid. The spray liquid was sprayed using a commercially available spray dryer ("L-8" manufactured by OHKAWARA KAKOHKI Co., Ltd.). The spray conditions at this time were as follows; inlet temperature: 240° C.; outlet temperature: 140° C.; atomizer rotation speed: 30000 rpm; air flow: 1.0 kpa; and liquid flow rate: pump ("ROLLER PUMP RP-1000" manufactured by EYELA) rotation speed 25 rpm (about 50 ml/min). In this manner, a powder was obtained. The obtained powder was subjected to the tests (2) and (4) in Test Example 1. The results are shown in FIG. 12. As apparent from the results, the powder for molding of the present invention includes comparatively fine particles having a spherical shape, and thus is specifically suitable for powder-layered manufacturing process using an adhesive.

Example 8

A powder was prepared in the same manner as in Example 7 except for using, as the spray liquid, an aqueous solution obtained by dissolving 3600 g of hydroxyapatite (a compounding ratio of 90% by weight), 200 g of polyvinylpyrrolidone ("PVP-K90" manufactured by ISP Japan Ltd.) (a compounding ratio of 5% by weight), and 200 g of anhydrous magnesium sulfate (a compounding ratio of 5% by weight) in 16000 g of water. The obtained powder was subjected to the tests (2) and (4) in Test Example 1. The results are shown in FIG. 13. As apparent from the results, the powder for molding of the present invention includes comparatively fine particles having a spherical shape, and thus is specifically suitable for powder-layered manufacturing process using an adhesive.

Example 9

An aqueous solution was obtained by dissolving 3200 g of sodium chloride added with 2% of calcium phosphate (a compounding ratio of 80% by weight), 200 g of polyvinylpyrrolidone ("PVP-K90" manufactured by ISP Japan Ltd.) (a compounding ratio of 5% by weight), and 600 g of anhydrous magnesium sulfate (a compounding ratio of 15% by weight) in 16000 g of water. The aqueous solution was used as a spray liquid. The spray liquid was sprayed using a commercially available spray dryer ("L-8" manufactured by OHKAWARA KAKOHKI Co., Ltd.) to obtain a powder. The spray conditions at this time were as follows; inlet temperature: 240° C.; outlet temperature: 140° C.; atomizer rotation speed: 30000 rpm; air flow: 1.0 kpa; and liquid flow rate: pump ("ROLLER PUMP RP-1000" manufactured by EYELA) rotation speed 25 rpm (about 50 ml/min).

Example 10

A powder was prepared in the same manner as in Example 9 except for using, as the spray liquid, an aqueous solution obtained by dissolving 3000 g of sodium chloride added with 2% of calcium phosphate (a compounding ratio of 75% by weight), 200 g of polyvinylpyrrolidone ("PVP-K90" manufactured by ISP Japan Ltd.) (a compounding ratio of 5% by weight), and 800 g of anhydrous magnesium sulfate (a compounding ratio of 20% by weight) in 16000 g of water.

Test Example 2

Powder release characteristics were tested using each powder of Example 1, Example 9, and Example 10 when producing a molded article. For the test, a molded test piece (rectangular solid with dimensions of 42 mm×15 mm×15 mm) was produced using each powder as a powder for molding with a commercially available molding apparatus's ("type Z402" manufactured by Z Corporation) by powder-layered manufacturing molding method. A mixed solution of ethanol/water (50 parts by weight/50 parts by weight) was used as a spray liquid. The molded article was taken out from a molding bath, and brushed with a soft brush five times per face. Then, the molded article was weighed (A). Next, the molded article was dried in a box dryer at 120° C. for 45 minutes. Excess materials were thoroughly brushed away, and the molded article was weighted (B). The powder release was calculated by the below formula. When the value is smaller, the powder release performance is higher. The results are shown in Table 4. Table 4 also shows the results such as bulk density of each powder measured in a similar manner to that in Test Example 1.

Powder release (%)=[(A−B)/B]×100

TABLE 4

|  | Magnesium sulfate 5% (Example 1) | Magnesium sulfate 15% (Example 9) | Magnesium sulfate 20% (Example 10) |
| --- | --- | --- | --- |
| Bulk density, g/mL | 0.71 | 0.71 | 0.70 |
| Drying loss (water content), % | 1.9 | 1.8 | 1.9 |
| Friability, % | 27.7 | 34.6 | 39.5 |
| Angle of repose, degree | 37 | 38 | 37 |
| Powder release, % | 100.3 | 25.9 | 20.6 |

From the results in Table 4, each powder having a magnesium sulfate content of 15 to 20% by weight has a low powder release value, and thus it is revealed that such powder can achieve excellent characteristic as a powder for molding.

Test Example 3

The component distribution of the particle included in the powder of Example 9 and the strength of the molded article from the powder were compared with those of a coated powder.

<Preparation of Coated Powder>

A coated powder was prepared as follows. An aqueous solution was obtained by dissolving 3600 g of sodium chloride added with 2% of calcium phosphate and 200 g of anhydrous magnesium sulfate in 16000 g of water. The aqueous solution was used as a spray liquid. The spray liquid was sprayed using a spray dryer ("L-8" manufactured by OHKAWARA KAKOHKI Co., Ltd.). The spray conditions at this time were as follows; inlet temperature: 240° C.; outlet temperature: 140° C.; atomizer rotation speed: 30000 rpm; air flow: 1.0 kpa; and liquid flow rate: pump ("ROLLER PUMP RP-1000" manufactured by EYELA) rotation speed 25 rpm (about 50 ml/min). Into a Wurster tumbling fluidized bed granulator ("FD-MP-01S"S manufactured by POWREX CORPORATION), 400 g of the powder obtained in this manner was placed, and sprayed with 700 g of a coating solution dissolving 21 g of polyvinylpyrrolidone ("PVP-K90" manufactured by ISP Japan Ltd.) in ethanol. While keeping the air supply temperature from 59 to 61° C. and the air exhaust temperature from 36 to 45° C. during spray, a sample was prepared with a bottom spray at a spray liquid flow rate of 3.29 g/min, a spray air flow rate of 30 to 55 L/min, a spray air pressure of 0.4 MPa, and an air supply rate of 0.5 to 0.75 m³/min.

Separately, a powder without polyvinylpyrrolidone was prepared as a comparative sample. Specifically, an aqueous solution was prepared by dissolving 3600 g of sodium chloride added with 2% of calcium phosphate and 200 g of anhydrous magnesium sulfate in 16000 g of water. The aqueous solution was used as a spray liquid. The spray liquid was sprayed in the same condition as in the case of the coated powder to prepare a powder.

<Analysis of Element Distribution and Determination of Strength>

Element distribution analysis and strength determination were carried out on each powder. Each test method was as shown in (1) and (2) below.

(1) Analysis of Element Distribution

Figure 14:
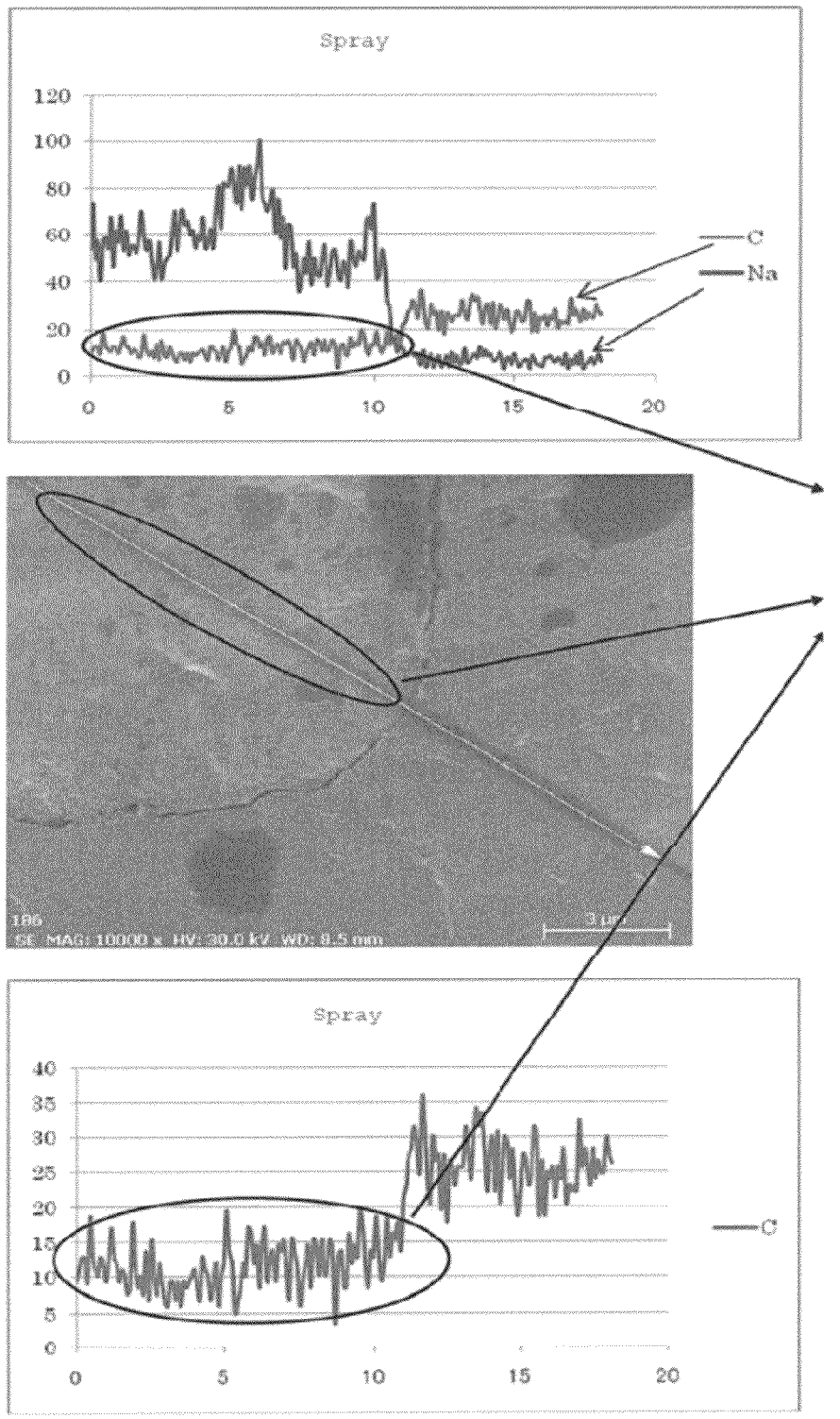
[FIG. 14]
Figure 16:
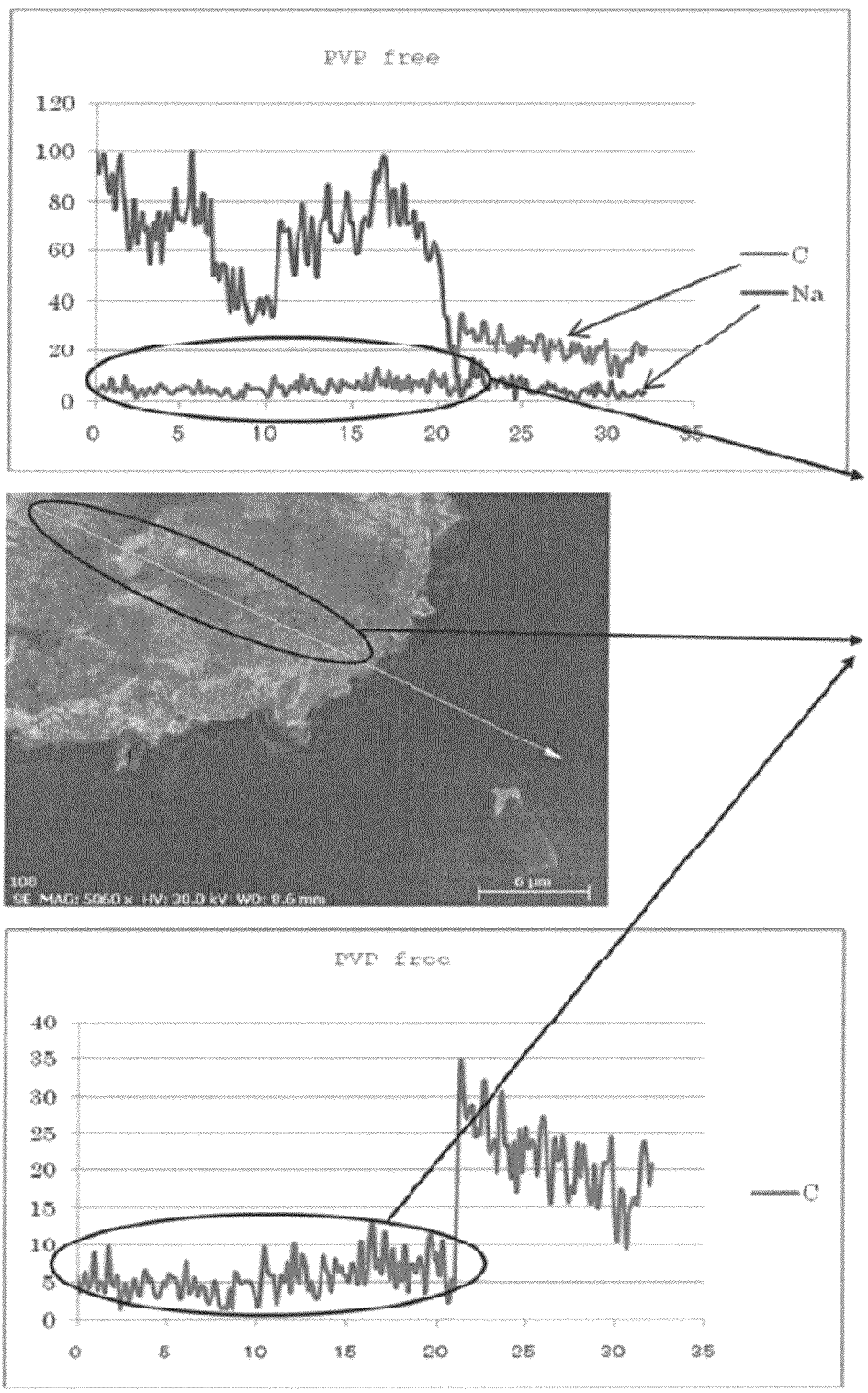
[FIG. 16]

First, an analysis sample was prepared. Specifically, a sample (particle) was embedded and fixed using an epoxy resin (G-2 manufactured by Gatan Inc.), and then a cross section was polished to a mirror-smooth state. On the polished face, platinum deposition was performed to prepare a sample for cross section analysis. Using the sample for cross section analysis, a secondary electron image and element distribution were observed. These results are shown in FIG. 14 to FIG. 16.

(1-1) Observation of Secondary Electron Image (SEM Image)

The sample for cross section analysis was fixed on carbon tape to prepare a sample for observation. For the observation, an ultra-high resolution scanning electron microscope ("SU-800" manufactured by Hitachi High-Technologies Corporation) was used to obtain a secondary electron image (SEM image) at an acceleration voltage of 30 kV.

(1-2) Observation of Element Distribution

The sample for cross section analysis was fixed on carbon tape to prepare a sample for observation. For the observation, an ultra-high resolution scanning electron microscope ("SU-800" manufactured by Hitachi High-Technologies Corporation) was used to obtain a secondary electron image (SEM image) at an acceleration voltage of 30 kV, and then an energy dispersive X-ray spectrometer (EDS; QUANTAX manufactured by Bruker AXS) was used to observe each element distribution of carbon and sodium at an acceleration voltage 30 kV.

(2) Determination of Strength

First, a tablet for strength determination was prepared. Into a glass container (Snapcup No. 30, 30 mm diameter×45 mm height, manufactured by Maruemu Corporation), 2.5 g of sample was weighed, and the surface was flattened. Then, the container was left in a climate chamber at 25° C. and 60% RH for 15 hours. The container was left in a dryer controlled at 120° C. for 3 hours and then cooled on a cold water pad for 3 minutes, and the tablet was taken out from the glass container to give a tablet for strength determination.

Figure 17:
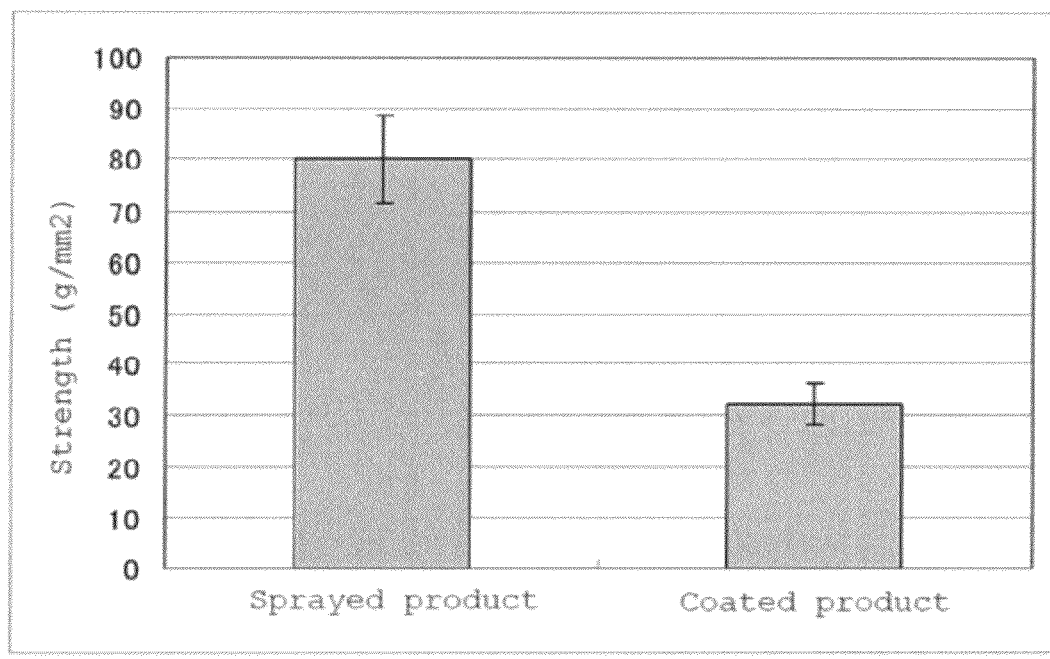
[FIG. 17]

Each strength was determined on eight obtained tablets for strength determination using a particle strength determination system ("GRANO" manufactured by OKADA SEIKO CO., LTD) and using a load cell with a rating capacity of 20 N ("LUR-A-200NSA1" manufactured by KYOWA ELECTRONICS INSTRUMENTS CO., LTD.). The results are shown in Table 5 and FIG. 17. FIG. 17 shows each mean value of the strengths of tablets.

TABLE 5

| Example 9 (strength (g/mm$^2$)) | Coated powder (strength (g/mm$^2$)) |
|---|---|
| 92.3 | 30.2 |
| 76.5 | 30.2 |
| 78.1 | 41.6 |
| 73.4 | 32.0 |

TABLE 5-continued

| Example 9 (strength (g/mm$^2$)) | Coated powder (strength (g/mm$^2$)) |
|---|---|
| 87.6 | 32.1 |
| 90.2 | 30.0 |
| 75.7 | 31.8 |
| 68.0 | 29.7 |
| 80.225 (mean value) | 32.2 (mean value) |

Each of FIG. 14 to FIG. 16 shows the distributions of carbon and sodium elements, which were obtained by irradiating each sample cross section with electron beam in the arrow direction in the secondary electron image and detecting on the irradiated line.

FIG. 15 shows that the coated powder having a surface layer of PVP had three phases varying in the carbon distribution (in the lower view in FIG. 15, a region from 0 to about 15 on the horizontal axis (the first phase), a region from about 16 to about 20 on the horizontal axis (the second phase), and a region from about 21 to about 33 on the horizontal axis (the third phase)) when irradiated with electron beam from the center of the cross section to the surface (see the sign A in FIG. 15). Meanwhile, in the cross section of the comparative powder without PVP shown in FIG. 16, two varied phases were observed in the carbon distribution (in the lower view in FIG. 16, a region from 0 to about 20 on the horizontal axis (the first phase), and a region from about 21 to about 33 on the horizontal axis (the second phase)) (see the sign B in FIG. 16).

That is, the comparison between both results reveals that the coated powder has the carbon distributions from a level where no carbon is substantially observed (background level) (the strength of the vertical axis: in the lower view in FIG. 15, a region from 0 to about 15 on the horizontal axis) through a level where the carbon distribution derived from PVP present in the coating layer is observed (in the lower view in FIG. 15, a region from about 16 to about 20 on the horizontal axis) to a level where the carbon distribution is derived from the embedded epoxy resin (in the lower view in FIG. 15, a region from about 21 to about 33 on the horizontal axis).

In contrast, FIG. 14 shows that the powder obtained in Example 9 maintained high distribution frequency of carbon on the cross section of the powder and the carbon element was distributed with a certain content to the inside of the particles (see the sign C in FIG. 14). That is, in the powder particles of the invention, it is revealed that the inorganic component and the organic polymer component are homogeneously distributed inside the particle.

Furthermore, apparent from the strength test results, it is revealed that the powder obtained in Example 9 shows higher strength than that of the coated powder. As shown in Table 5, it is revealed that it usually achieves a high strength of 65 g/mm$^2$ or more, specifically a high strength of 70 g/mm$^2$ or more, and further specifically a high strength of 80 g/mm$^2$ or more. That is, it is revealed that when especially using water-soluble inorganic salts (specifically, sodium chloride and magnesium sulfate) as an inorganic component and using a powder in which the components are uniformly mixed in each particle, a higher strength can be achieved than that of a molded article from the coated powder.

We claim:

1. A powder for molding comprising particles, each particle containing an inorganic component and a water-soluble organic polymer component, wherein the inorganic component and the water-soluble organic polymer component are uniformly distributed in each particle, and wherein the inorganic component is a water-soluble inorganic salt.

2. The powder for molding according to claim 1, wherein the water-soluble inorganic salt is at least one of an alkali metal salt and an alkaline earth metal salt.

3. The powder for molding according to claim 1, wherein the inorganic component includes sodium chloride and magnesium sulfate.

4. The powder for molding according to claim 1, wherein the powder is obtained by spray-drying an aqueous solution in which the water-soluble inorganic salt and the water-soluble organic polymer are dissolved in water.

5. The powder for molding according to claim 1 used for a method for producing a molded article, the method comprising a step (a) of spreading the powder on a plane surface to form a powder layer, and thereafter spraying a spray liquid containing at least one of a water-miscible organic solvent and water onto a predetermined area in the powder layer to make the binding strength among particles in the sprayed area higher than the binding strength among particles in the unsprayed area; a step (b) of further planar spreading the powder on the powder layer after spray to form an upper powder layer, and thereafter spraying the spray liquid onto a predetermined area in the upper powder layer to make the binding strength among particles in the sprayed area higher than the binding strength among particles in the unsprayed area; and a step (c) of repeating the step (b) once or more times to form a molded article composed of layers of the sprayed areas.

6. The powder for molding according to claim 1, wherein 1) the inorganic component includes 70 to 90% by weight of sodium chloride as a first component, 2) the inorganic component includes 5 to 25% by weight of magnesium sulfate as a second component, and 3) the water-soluble organic polymer component includes 1 to 10% by weight of polyvinylpyrrolidone.

7. A method for producing a molded article from a powder, the method comprising:

a step (a) of planar spreading a powder for molding on a plane surface to form a powder layer, each particle of the powder containing an inorganic component and a water-soluble organic polymer component, wherein the inorganic component and the water-soluble organic polymer component are uniformly distributed in each particle, and wherein the inorganic component is a water-soluble inorganic salt, and thereafter spraying a spray liquid containing at least one of a water-miscible organic solvent and water onto a predetermined area in the powder layer to make the binding strength among particles in the sprayed area higher than the binding strength among particles in the unsprayed area;

a step (b) of further planar spreading the powder for molding on the powder layer after spray to form an upper powder layer, and thereafter spraying the spray liquid onto a predetermined area in the upper powder layer to make the binding strength among particles in the sprayed area higher than the binding strength among particles in the unsprayed area;

a step (c) of repeating the step (b) once or more times to form a molded article composed of layers of the sprayed areas; and a step (d) of taking out the molded article from the powder.

8. The producing method according to claim 7, wherein the water-soluble inorganic salt is at least one of an alkali metal salt and an alkaline earth metal salt.

9. The producing method according to claim 7, wherein the inorganic component includes sodium chloride and magnesium sulfate.

10. The producing method according to claim 7, wherein the powder for molding is obtained by spray-drying an aqueous solution in which the water-soluble inorganic salt and the water-soluble organic polymer are dissolved in water.

11. The producing method according to claim 7, wherein 1) the inorganic component includes 70 to 90% by weight of sodium chloride as a first component, 2) the inorganic component includes 5 to 25% by weight of magnesium sulfate as a second component, and 3) the water-soluble organic polymer component includes 1 to 10% by weight of polyvinylpyrrolidone.

* * * * *